United States Patent [19]

Nishimura et al.

[11] 4,205,642
[45] Jun. 3, 1980

[54] COVER FOR A VENTILATION VALVE

[75] Inventors: Yutaka Nishimura, Okazaki; Takuro Ono, Kariya, both of Japan

[73] Assignee: Toyota Jidosha Kogyo Kabushiki Kaisha, Toyota, Japan

[21] Appl. No.: 864,845

[22] Filed: Dec. 27, 1977

[30] Foreign Application Priority Data

Jul. 18, 1977 [JP] Japan .................. 52-96354[U]

[51] Int. Cl.$^2$ ........................... F02F 7/00; F02G 5/02
[52] U.S. Cl. ........................... 123/119 B; 123/143 C; 123/195 C
[58] Field of Search ........... 123/148 A, 198 E, 195 C, 123/143 C, 119 B; 137/375, 377, 382

[56] References Cited

U.S. PATENT DOCUMENTS

| | | | |
|---|---|---|---|
| 3,367,358 | 2/1968 | Rentschler | 137/375 |
| 3,587,544 | 6/1971 | Miles | 123/119 B |
| 3,738,383 | 6/1973 | David | 137/375 |
| 3,778,028 | 12/1973 | Graves | 137/375 |
| 3,828,744 | 8/1974 | Hollins | 123/119 B |

Primary Examiner—Charles J. Myhre
Assistant Examiner—Carl Stuart Miller
Attorney, Agent, or Firm—Stevens, Davis, Miller & Mosher

[57] ABSTRACT

A cover for a ventilation valve in a vehicle engine provided in the passage of blow-bye gas to be transmitted into an intake manifold. The cover is adapted to isolate the ventilation valve from the cold and prevent it from being freezing.

2 Claims, 5 Drawing Figures

COVER FOR A VENTILATION VALVE

The present invention relates to a cover for a ventilation valve used in an engine of a vehicle to reduce unburnt hydrocarbon by returning blow-bye gas from a crank case to an intake system. The cover is utilized to prevent freezing of the ventilation valve in the cold season.

In a conventional vehicle engine, there is provided a reductor for blow-bye gas to purify exhaust gas. The reductor is adapted to return unburnt hydrocarbon that has been produced by fire-extinguishing operation of a cylinder upon reciprocation of a piston therein from the crank case into the intake system to be burnt in the cylinder.

The reductor introduces fresh air from an air cleaner to the crank case to ventilate the same, and the mixture of fresh air and blow-bye gas is transmitted into the intake manifold through a positive crank case ventilation valve. However, when the engine is completely loaded, blow-bye gas is also transmitted into the air cleaner since the intake capacity of the ventilation valve is lowered.

In a conventional vehicle engine, the ventilation valve is provided in an open portion such as a passage connecting the intake manifold with the cylinder head cover or the crank case, and is exposed to cold air from a cooling fan or cold wind in the cold season. Consequently, water contained in blow-bye gas is frozen in the ventilation valve, leading to blockade of the ventilation valve. Blow-bye gas is prevented by this blockade from flowing into the intake manifold, and flows into the air cleaner through another passage connected with the passage for fresh air. Blow-bye gas thus increased in quantity flows through the air cleaner into a carburetor, and tends to lower the function of the carburetor by its moisture or frozen water contained therein, leading to malfunction of the engine.

It is an object of the present invention to provide a cover for a ventilation valve in a vehicle engine provided in the passage of blow-bye gas to be transmitted into an intake manifold so as to prevent the ventilation valve from being frozen by cold air from a cooling fan or cold wind in the cold season.

It is another object of the present invention to have blow-bye gas flow smooth and prevent malfunction of the vehicle engine by preventing freezing of the ventilation valve.

The invention will now be described in further detail by way of example with reference to the accompanying drawings, in which.

Figure 1:
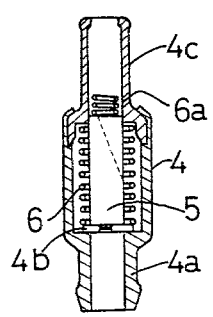
FIG. 1 is a cross-sectional view of a conventional ventilation valve.
Figure 2:
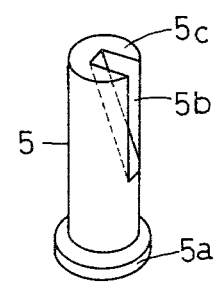
FIG. 2 is an enlarged perspective view of an inner valve.
Figure 3:
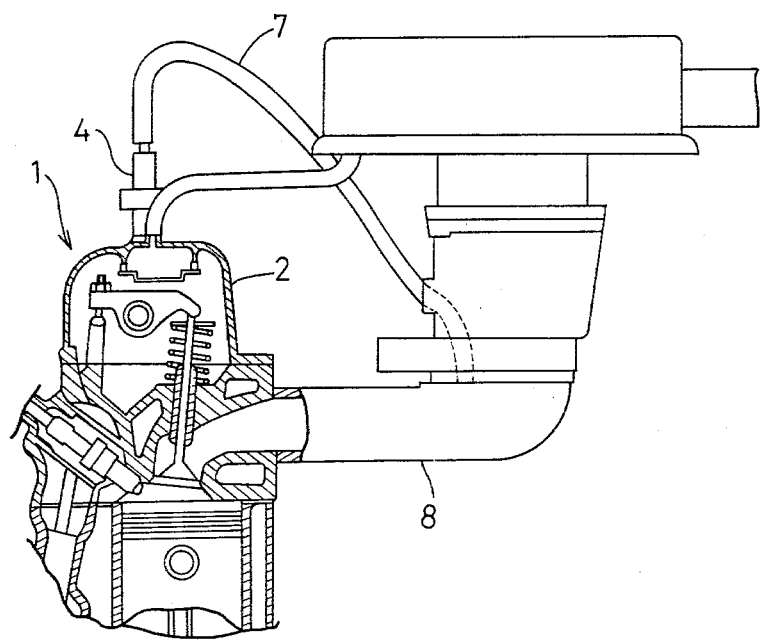
FIG. 3 is a fragmentary cross-sectional view of a vehicle engine in which the ventilation valve of FIG. 1 is applied to a cylinder head cover.

Referring now to the drawings, there is shown an engine 1 of a vehicle provided with a cylinder head cover 2 having a cylindrical projection 2a in the upper end thereof into which a grommet 3 is fitted under pressure. The grommet 3 receives the lower end 4a of a ventilation valve 4 in which an inner valve 5 having a flange 5a at the lower end thereof is inserted. A tapered groove 5b is provided in the upper end 5c of the inner valve 5. A coil spring 6 encloses the inner valve 5 to press the flange 5a against the valve seat 4b of the ventilation valve 4. Another coil spring 6a is provided in the upper end 4c of the ventilation valve 4 above the upper end 5c of the inner valve 5. The upper end 4c of the ventilation valve 4 is engaged with an end of a ventilation hose 7 which is connected with an intake manifold 8 at the other end.

When the engine 1 is not driven, the inner valve 5 is urged by the coil spring 6 to press the flange 5a against the valve seat 4b and to close the ventilation valve 4. On the other hand, when the engine 1 is idly or retardingly driven, the valve 5 is raised against the pressure of the coil spring 6 by the high negative pressure in the intake manifold 8, and the upper end 5c of the valve 5 engages the coil spring 6a in the upper end 4c of the ventilation valve 4. Consequently, the space between the tapered groove 5b and the inner periphery of the ventilation valve 4 is narrowed to lower the flow rate of blow-bye gas flowing into the intake manifold 8 therethrough so that the engine 1 is not affected by blow-bye gas.

When the engine 1 is driven at a normal speed, the flange 5a of the inner valve 5 is kept away from the valve seat 4b of the ventilation valve 4 since the negative pressure of the intake manifold 8 is balanced with the pressure of the coil spring 6. Therefore, blow-bye gas flowing into the cylinder head 2 passes the flange and the tapered groove 5b, and flows into the intake manifold 8 through the ventilation hose 7.

As hereinabove described, the ventilation valve 4 is adapted to adjust the flow rate of blow-bye gas when the engine 1 is driven at a normal speed, and is closed when the engine 1 is stopped.

Figure 4:
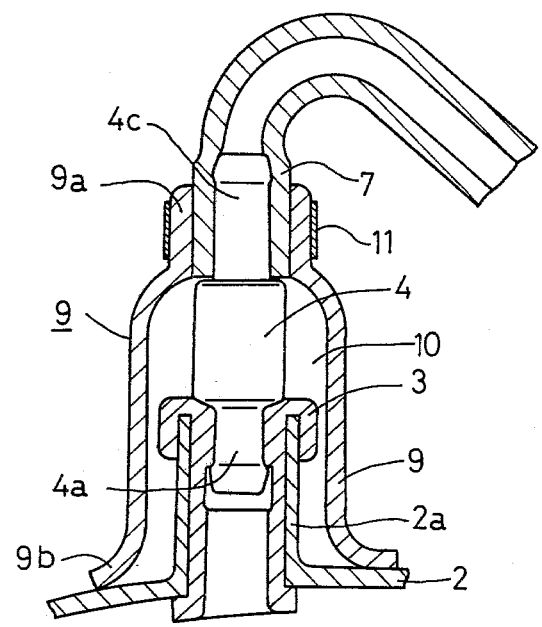
FIG. 4 is an enlarged cross-sectional view of the ventilation valve shown in FIG. 3 which is applied with a cover of the present invention.

Attention is now drawn to FIG. 4 in which the ventilation valve 4 is enclosed with a bell-shaped cover 9 of rubber or synthetic resin. The cover 9 is provided with an upper cylindrical portion 9a and an outwardly-widened lower portion 9b. The upper cylindrical portion 9a receives the end of the ventilation hose 7 engaged with the upper end 4c of the ventilation valve 4, and the lower portion 9b contacts the upper surface of the cylinder head cover 2. A space 10 is defined between the outer periphery of the ventilation valve 4 and the inner periphery of the cover 9. The upper cylindrical portion 9a is tightly secured to the ventilation hose 7 by a clamp 11.

When the engine 1 is normally driven in the cold season, blow-bye gas flowing into the cylinder head cover 2 passes the ventilation valve 4 through the inner valve 5, and flows into the intake manifold 8 via the ventilation hose 7. The cover 9 protects the ventilation valve 4 against cold air from a cooling fan (not shown) and cold wind to prevent cooling of blow-bye gas in the ventilation valve 4 and freezing of water contained therein.

Figure 5:
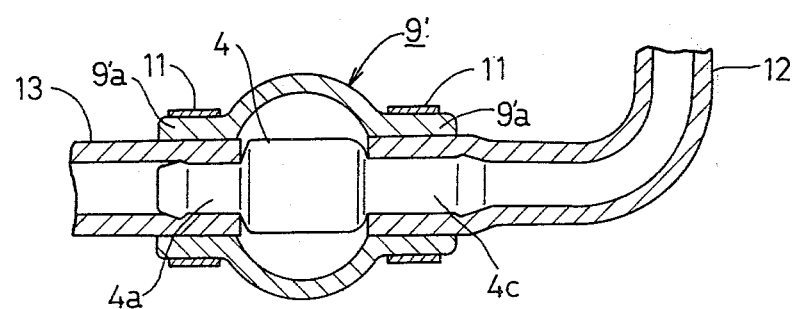
FIG. 5 is a cross-sectional view showing another embodiment of the present invention in which the ventilation valve applied with the cover is provided between a pair of ventilation hoses.

In FIG. 5, the ventilation valve 4 is provided between two ventilation hoses 12 and 13. The ventilation hose 12 as shown on the right-hand side of FIG. 5 is connected to the intake manifold 8, and the other ventilation hose 13 as shown on the left-hand side is connected to a crank case (not shown). The cover 9' shown in FIG. 5 comprises two cylindrical portions 9'a to be tightly secured to the ventilation hoses 12 and 13 on both sides thereof.

The position of the ventilation valve varies with the type of the engine, and the shape and the material of the cover can be optionally selected to adapt it to the position of the ventilation valve.

While the invention has been described with reference to a preferred embodiment thereof, it is to be understood that modifications or variations may be easily made without departing from the scope of this invention which is defined by the appended claims.

What is claimed is:

1. A vehicle engine comprising:

an intake manifold;

a cylinder head cover having a substantially horizontally extending section having a substantially cylindrical pipe section extending vertically upwardly therefrom;

a grommet secured to the upper end of said pipe section, said grommet having a substantially vertically extending fluid flow passage therethrough;

a substantially vertically extending ventilation valve having substantially cylindrical upper fluid outlet and lower fluid inlet ends and a central body section between the ends of the valve, said grommet being in encircling direct contact with the lower end of said valve;

a ventilation hose having one end in encircling direct contact with the upper end of said valve, the other end of said hose being connected to the intake manifold;

a substantially vertically extending heat insulating one-piece cover for covering the ventilation valve, the grommet and the cylindrical pipe section of the cylinder head cover, said one-piece cover comprising:

an upper substantially cylindrical end in encircling direct contact with the one end of the ventilation hose;

a substantially cylindrical central body section radially outwardly spaced throughout its extent from and defining a hollow space with the central body section of the ventilation valve, the grommet, and the pipe section of the cylinder head cover; and a lower annular end extending downwardly and radially outwardly from the lower end of the body section of the one-piece cover, said lower end of said one-piece cover being in direct contact with the substantially horizontally extending section of the cylinder head cover; and a clamp for tightly securing the upper end of the one-piece cover to the one end of the ventilation hose and it to the upper end of the ventilation valve.

2. The invention as defined in claim 1, wherein said cover is made of elastic material selected from the group consisting of rubber and synthetic resin.

* * * * *